(12) United States Patent
Linder

(10) Patent No.: US 9,795,863 B1
(45) Date of Patent: Oct. 24, 2017

(54) SKATEBOARD TRUCK

(71) Applicant: Michael Linder, Roswell, GA (US)

(72) Inventor: Michael Linder, Roswell, GA (US)

(*) Notice: Subject to any disclaimer, the term of this patent is extended or adjusted under 35 U.S.C. 154(b) by 0 days.

(21) Appl. No.: 15/253,403

(22) Filed: Aug. 31, 2016

(51) Int. Cl.
*A63C 17/00* (2006.01)
*A63C 17/01* (2006.01)
*B60B 19/14* (2006.01)

(52) U.S. Cl.
CPC .......... *A63C 17/012* (2013.01); *A63C 17/015* (2013.01); *B60B 19/14* (2013.01)

(58) Field of Classification Search
CPC ....... A63C 17/01; A63C 17/04; A63C 17/012; A63C 17/015; A63C 17/24; B60B 19/14
See application file for complete search history.

(56) References Cited

U.S. PATENT DOCUMENTS

| | | | |
|---|---|---|---|
| 3,379,454 A | 4/1968 | Woodman | |
| 3,512,798 A | 5/1970 | Siegel | |
| 5,409,265 A * | 4/1995 | Douglass | A63C 17/01 280/11.27 |
| 5,549,331 A * | 8/1996 | Yun | A63C 17/004 16/26 |
| 6,508,335 B2 * | 1/2003 | Zinanti | A63C 17/01 188/1.12 |
| 6,899,344 B1 * | 5/2005 | Raynor | A63C 17/02 280/11.221 |
| 8,146,929 B1 | 4/2012 | Johnson | |
| 2006/0220371 A1 * | 10/2006 | Yang | A63C 17/006 280/843 |
| 2011/0148063 A1 * | 6/2011 | Reyes, Jr. | A63C 17/016 280/87.042 |
| 2011/0272903 A1 * | 11/2011 | Lewis | A63C 17/015 280/87.042 |

FOREIGN PATENT DOCUMENTS

| | | |
|---|---|---|
| GB | 2454532 | 5/2009 |
| WO | WO9116958 | 11/1999 |
| WO | WO2010001183 | 1/2010 |

* cited by examiner

*Primary Examiner* — Brian Swenson
(74) *Attorney, Agent, or Firm* — Robert J. Veal; Veal Intellectual Property, LLC

(57) ABSTRACT

A truck for a skateboard utilizes spherical balls mounted for rotation beneath the deck of the skateboard such that the balls are freely rotatable in a direction along the longitudinal axis and are less rotatable in a direction transverse to the axis such that the skateboard exhibits behavior expected from a snowboard in snow.

11 Claims, 2 Drawing Sheets

SKATEBOARD TRUCK

BACKGROUND OF THE INVENTION

The present invention relates to the field of board sports and more particular to the field of roller board sports such as skate boarding. In even greater particularity the present invention relates to roller boards that are to emulate snow boards in their functional characteristics. Skateboards and larger longboards are typically defined by a deck mounted on a pair of trucks carrying a pair of wheels. The trucks are located at the forward and rear end of the deck and the rider positions himself between or above the trucks to ride the board or perform stunts.

Conventional skate boards and roller boards have the deck supported on trucks wherein the wheels are mounted on an axle transverse to the longitudinal axis of the deck. Accordingly, the deck is constrained to move along this line. Some prior art boards such as shown in U.S. Pat. No. 8,146,929 or Great Britain Patent No. 2454532 have included spherical rollers that allow movement in any direction, however these type boards do not give the same sensation or movement as one obtains on a snowboard.

SUMMARY OF THE PRESENT INVENTION

It is an object of the present invention to emulate the action of a snowboard. Snowboards do not travel down a slope at the same rate of speed when the axis of the board is not aligned with the slope of the hill. In other words as a rider makes turns or slaloms across the snowy slope the coefficient of sliding friction as well as the inclination of the board to the snow changes. These variations cannot be matched by a conventional roller board where the wheels are aligned with the fore and aft direction of the deck. Likewise, free rolling spherical wheels cannot match the variation experienced in snowboarding.

It is an object of the invention to provide free rolling movement of the support rollers in a longitudinal direction and lesser rolling movement in a lateral movement.

These and other objects and advantages of the invention will become apparent from the following detailed description of the preferred embodiment of the invention.

BRIEF DESCRIPTION OF THE DRAWINGS

An apparatus for supporting a skateboard is depicted in the accompanying drawings which form a portion of this disclosure and wherein.

DESCRIPTION OF THE PREFERRED EMBODIMENT

Figure 1:
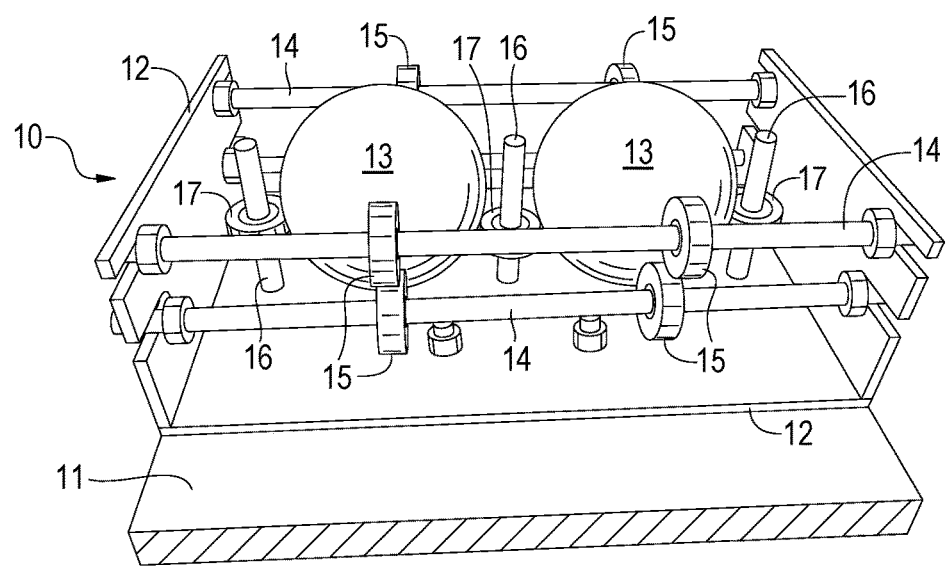
FIG. 1 is a perspective view of one of the trucks embodying this invention.
Figure 2:
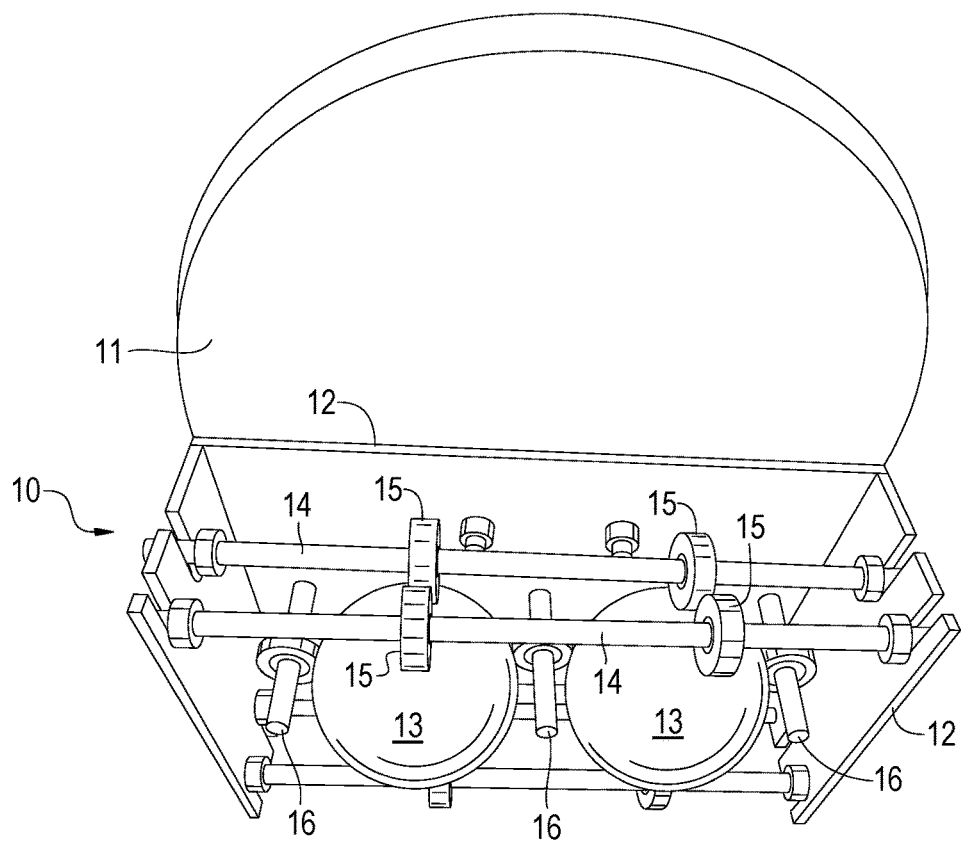
FIG. 2 is an opposite perspective view of the truck of FIG. 1.
Figure 3:
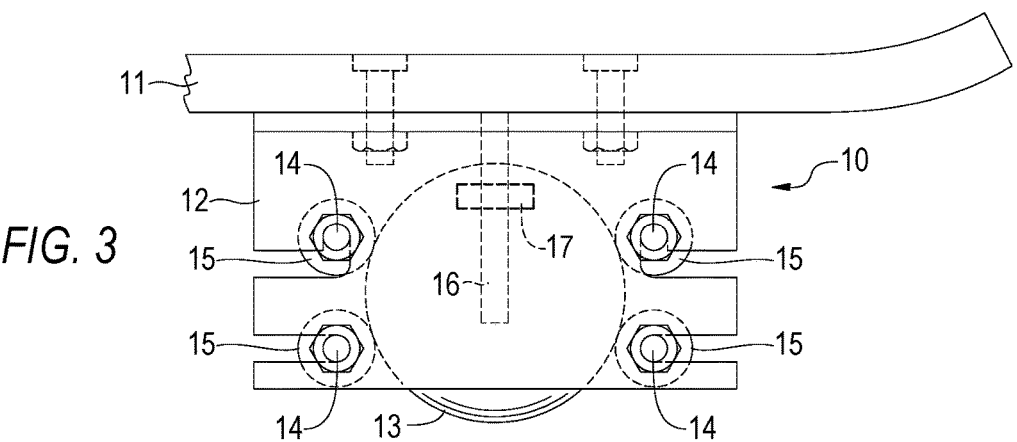
FIG. 3 is a side elevation view of the truck shown in FIG. 1.
Figure 4:
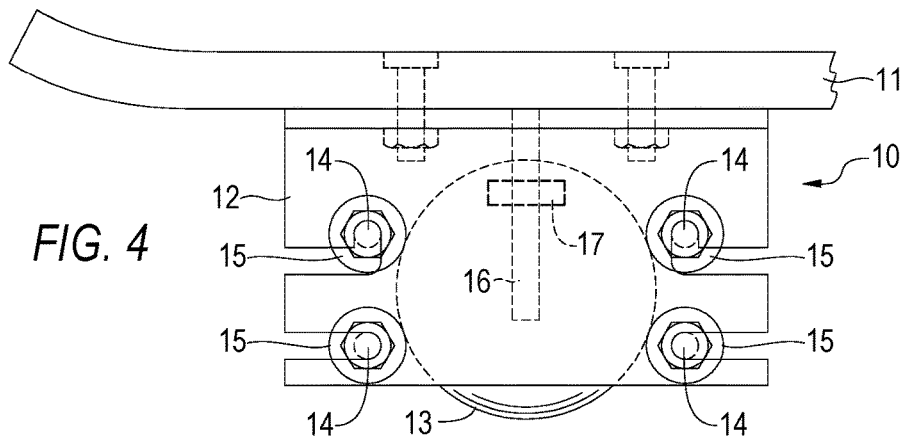
FIG. 4 is an opposite side elevation view of the truck shown in FIG. 1.
Figure 5:
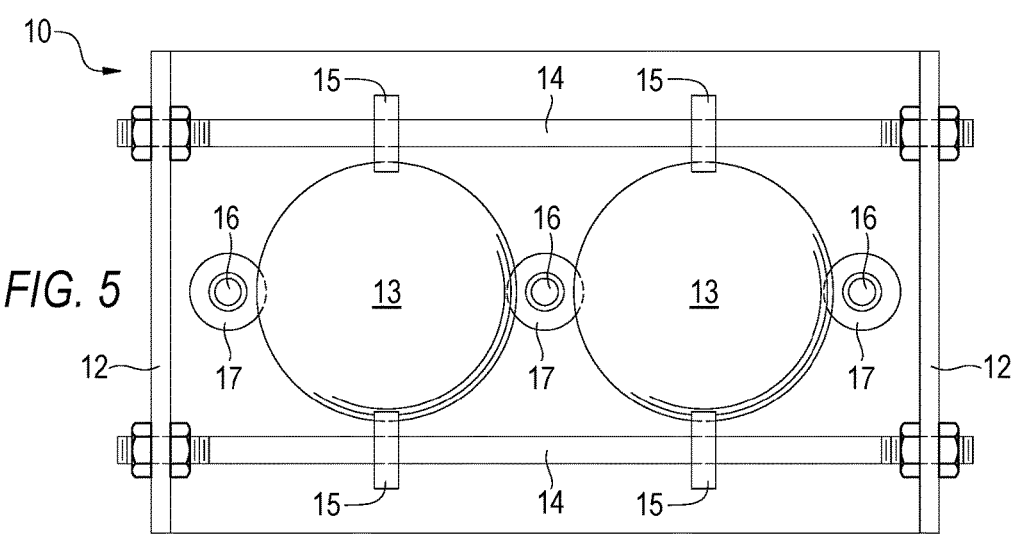
FIG. 5 is a bottom view of the truck shown in FIG. 1.

Referring to the FIGS. 1-5 for a clearer understanding of the invention, it may be seen that the preferred embodiment of the invention contemplates a pair of identical trucks 10 supporting a deck 11. Each carriage or truck 10 includes a frame 12 suitably attached to the underside of the skate board deck 11, a pair spherical of roller balls 13 positioned with said frame 12 in lateral alignment with the width of the skateboard deck 11, a plurality of retaining rods 14 mounted to said frame in front of and behind said pair of roller balls 13, said retaining rods 14 each supporting thereon at least one primary rotatable bearing 15 in rolling engagement with each of said roller balls 13, and a plurality of retaining posts 16 extending vertically adjacent said roller balls 13 with each of said plurality of retaining posts 16 supporting at least one secondary rotatable bearing 17 in rolling engagement with said roller balls, wherein said roller bearings 15 and 17 are aligned to permit substantially free rotation of said roller balls 13 in a direction aligned with a longitudinal axis of said skateboard deck 11 and restricted rotation of said roller balls 13 in a direction transverse to said longitudinal axis.

In greater detail it is to be understood that frame 12 is shown as being substantially rectangular in shape, however the frame may take any shape desired that provides the proper connection and positioning of the spherical roller balls 13 relative to the deck 11. Likewise the frame 12 may be made of a suitable metal, such as steel or aluminum, or it may be made from a suitable plastic or composite material, such as an ABS plastic of the type typically used in load bearing applications. Likewise, spherical roller balls 13 maybe metallic or made from any suitable composite or plastic material that provides durability and maintains the spherical true roundness under the wear and usage the roller balls will be subjected to.

Referring to FIG. 1, it will be seen that spherical roller balls 13 are maintained in position solely by contact with bearings 15 and 17. That is to say, there is no fixed axle passing through the roller balls 13 and each roller ball is free to independently rotate relative to the deck, frame or other roller ball. Although it is expected that each roller ball 13 in a truck 10 will roll in substantially the same direction as the other ball in the truck, it is to be understood that there is no mechanical constraint in the structure that requires the rotation of the spherical roller balls to be identical. Each spherical roller ball 13 is contacted by four primary roller bearings 15. Primary roller bearings 15 are mounted for rotation in parallel planes that are also parallel and normal to the longitudinal axis of deck. That is to say that the primary roller bearings 15 rotate freely about axes perpendicular to the longitudinal axis of the deck when the deck is moving forwardly or rearwardly along its longitudinal axis, thus providing minimal rolling friction or resistance to the associated roller ball 13. Considering the position of the truck 10 to be at rest supporting the deck 11 on an underlying surface contacted by the roller balls 13, each ball 13 may be considered to have an upper and lower hemisphere. Two of the roller bearings 15 are mounted to contact the roller ball in each hemisphere with the two bearings separated by a distance along the length of the deck such that one of the primary bearings 15 in each hemisphere is a forward bearing and the other is a rearward bearing relative to the roller ball 15. Lateral positioning of the roller balls 13 is maintained by a pair of secondary roller bearings 17 engaging the roller balls 13 and mounted for rotation about axes which are normal to the deck 11. Secondary roller bearings 17 engage the respective roller balls near the junction of the upper and lower hemispheres and thus provide minimal rolling resistance to rotation of the roller balls when the deck is moving along its longitudinal axis. If a single roller bearing 17 engages both roller balls in a truck, then preferentially the bearing will be mounted direction on the junction of the upper and lower hemisphere so as to provide equal and minimal resistance to rotation of the roller balls in the pair, in as much as pure longitudinal motion of the deck will rotate the both roller balls about the same horizontal axis transverse to the direction of movement, thus the secondary roller bearing would not have minimal induce rotation and minimal sliding friction. It will be noted that in the illustrated embodiment the primary roller bearings 15 are mounted on horizontally extending retaining rods 14 or axles which are captured in and secured to frame 12, whereas secondary roller bearings 17 are mounted on vertically extending retaining rods 16, also secured to frame 12.

When a user riding the board, maneuverers the board such that his direction of travel is other than along the longitudinal axis of the deck 11, the roller balls 13 are still able to rotate in the direction of motion, however, the direction of motion of the surface of the roller balls contacting the primary and secondary roller bearings will be transverse to the mounted direction of movement of the roller bearings, thus the roller bearings may turn, but a portion of the energy propelling the board and user will be dissipated by sliding friction between the surface of the roller balls and the roller bearings. The amount of energy dissipated will be dependent upon the direction of motion relative to the plane of rotation of each of the roller bearings such that maximum sliding friction would be encountered when the rider tries to move the board along the transverse axis of the deck. It may therefore be seen that the apparatus provides minimum resistance to motion and maximum velocity when traveling in the direction of the longitudinal axis of the deck and provides progressively greater resistance to motion and lower velocity as the direction of motion moves from the direction of the longitudinal axis to a direction transverse of the longitudinal axis, thereby approximating the behavior of a snowboard being maneuvered by a snowboarder.

It is to be understood that the form of the invention shown is a preferred embodiment thereof and that various changes and modifications may be made therein without departing from the spirit of the invention or scope as defined in the following claims.

What is claimed is:

1. An apparatus for supporting a ridable platform comprising:
   a. at least one weight bearing spheres positioned along a longitudinal axis of said ridable platform;
   b. at least one primary bearing mounted for rotation about an axis perpendicular to said longitudinal axis and engaging said at least on weight bearing sphere for concomitant rotation in a vertical plane along said longitudinal axis;
   c. at least one secondary bearing mounted for rotation about an axis orthogonal said longitudinal axis and said perpendicular axis engaging said at least one weight bearing sphere for concomitant rotation in a horizontal plane parallel said longitudinal axis and said perpendicular axis; wherein said at least one primary bearing offers minimal resistance to rotation of said at least one weight bearing sphere along said longitudinal axis and greater resistance to rotation of said at least on weight bearing sphere along said perpendicular axis, and wherein, said at least one secondary bearing offers minimal resistance to rotation of said at least one weight bearing sphere about said orthogonal axis and greater resistance to rotation of said sphere along said perpendicular axis; and,
   d. a frame connected to said ridable platform with said at least one primary bearing and said at least one secondary bearing rotatably mounted to said frame.

2. The apparatus as described in claim 1 wherein said at least one weight bearing sphere is at least two weight bearing spheres positioned along opposite sides of said longitudinal axis.

3. The apparatus as described in claim 2 wherein each of the at least two weight bearing spheres is captured between two upper primary bearings and two lower primary bearings.

4. The apparatus as described in claim 3 wherein each of the at least two weight bearing spheres is captured between opposing laterally disposed secondary bearings such that each of the said two weight bearing spheres are independently captured and supported by said primary and secondary bearings.

5. The apparatus as described in claim 4 wherein said primary bearings and said secondary bearings are mounted for rotation about axes orthogonal to said longitudinal axis.

6. The apparatus as defined in claim 3 wherein said upper and lower primary bearings are mounted on rods supported in said frame and extending transversely of said longitudinal axis of said platform.

7. The apparatus as described in claim 1 wherein said frame is metallic.

8. The apparatus as described in claim 1 wherein said frame and said weight bearing spheres are non-metallic.

9. A carriage for a skateboard for attachment at the front or rear of a deck of said skateboard comprising a frame suitably attached to the underside of the deck, a pair of roller balls positioned with said frame in lateral alignment with the width of the deck, a plurality of retaining rods mounted to said frame in front of and behind said pair of roller balls, said retaining rods each supporting thereon at least one primary rotatable bearing in rolling engagement with each of said roller balls, and a plurality of retaining posts extending vertically adjacent said roller balls each of said plurality of retaining posts supporting at least one secondary rotatable bearing in rolling engagement with said roller balls, wherein said rotatable bearings and are aligned to permit substantially free rotation of said roller balls in a direction aligned with a longitudinal axis of said skateboard and restricted rotation of said roller balls in a direction transverse to said longitudinal axis.

10. The carriage as defined in claim 9 wherein said retainer rods are aligned transverse to a longitudinal axis of said deck, with each retainer rod supporting at least two primary rotatable bearings per roller ball.

11. The carriage as defined in claim 9 wherein each roller ball is maintained in position by four primary bearings with two of said four primary bearings contacting said roller ball in each hemisphere of said roller ball.

\* \* \* \* \*